(12) United States Patent
Sharma et al.

(10) Patent No.: US 9,798,166 B1
(45) Date of Patent: Oct. 24, 2017

(54) ATTENUATOR WITH IMPROVED FABRICATION CONSISTENCY

(71) Applicant: Mellanox Technologies Silicon Photonics Inc., Monterey Park, CA (US)

(72) Inventors: Monish Sharma, Artesia, CA (US); Wei Qian, Torrance, CA (US); Dazeng Feng, El Monte, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 0 days.

(21) Appl. No.: 15/414,547

(22) Filed: Jan. 24, 2017

(51) Int. Cl.
*G02F 1/025* (2006.01)

(52) U.S. Cl.
CPC ........ *G02F 1/025* (2013.01); *G02F 2201/063* (2013.01); *G02F 2201/08* (2013.01); *G02F 2202/104* (2013.01); *G02F 2202/105* (2013.01)

(58) Field of Classification Search
CPC ............... G02F 1/025; G02F 2201/063; G02F 2201/08; G02F 2202/104; G02F 2202/105
See application file for complete search history.

(56) References Cited

U.S. PATENT DOCUMENTS

| 6,316,281 | B1 * | 11/2001 | Lee | G02B 6/136 |
| | | | | 385/14 |
| 7,672,558 | B2 * | 3/2010 | Keyser | G02B 6/122 |
| | | | | 385/129 |
| 7,684,655 | B2 * | 3/2010 | Vonsovici | G02F 1/025 |
| | | | | 257/248 |
| 8,093,080 | B2 * | 1/2012 | Liao | G02B 6/12004 |
| | | | | 257/E31.042 |
| 2008/0157106 | A1 * | 7/2008 | Masui | B82Y 20/00 |
| | | | | 257/94 |
| 2008/0260320 | A1 * | 10/2008 | Laval | G02F 1/025 |
| | | | | 385/2 |

* cited by examiner

*Primary Examiner* — Ellen Kim
(74) *Attorney, Agent, or Firm* — Gavrilovich, Dodd & Lindsey, LLP

(57) ABSTRACT

A method of forming an attenuator on an optical device includes forming a ridge for a waveguide. The ridge is formed in a light-transmitting medium that is positioned on a base. The ridge extends upwards from slab regions of the light-transmitting medium. The method also includes forming trenches in the slab regions of the light-transmitting medium such that the trenches extend through the light-transmitting medium to the base. The trenches are formed such that the ridge is located between the trenches. The method also includes forming a semiconductor in a bottom of each of the trenches and then doping a region of each of the semiconductors.

17 Claims, 3 Drawing Sheets

ATTENUATOR WITH IMPROVED FABRICATION CONSISTENCY

FIELD

The invention relates to optical devices. In particular, the invention relates to optical attenuators.

BACKGROUND

A variety of optical devices employ optical attenuators to reduce the intensity of light signals carried within the optical device. These optical devices can employ ridge waveguides to confine light signals to particular regions of the optical device. A ridge waveguide is generally defined by a ridge of a light transmitting medium extending upward from slab regions of the light-transmitting medium.

Attenuators used in conjunction with ridge waveguides often employ free carrier absorption to achieve attenuation. During operation of these attenuators, electrical energy is applied to doped region of the light-transmitting medium so as to inject free carriers into the waveguide.

The doped regions are generally positioned in trenches positioned on opposing sides of the ridge waveguide. These trenches extend part way into the slab regions. As a result, light-transmitting medium is positioned in the bottom of each trench. The doped regions are formed in the light-transmitting medium at the bottom of the trenches.

The inventors have found that fabricating these attenuator structure results in an undesirably low yield of product. For instance, a large percentage of the devices have attenuators with undesirably low performance levels and are accordingly treated as waste. As a result, there is a need for an attenuator structure associated with a higher fabrication yield.

SUMMARY

A method of forming an attenuator on an optical device includes forming a waveguide ridge in a light-transmitting medium. The ridge extends upwards from slab regions of the light-transmitting medium. The light-transmitting medium is positioned on a base. The method also includes forming trenches in the slab regions of the light-transmitting medium such that the trenches extend through the light-transmitting medium to the base. The trenches are formed such that the ridge is located between the trenches. The method also includes forming a semiconductor in a bottom of each of the trenches and then doping a region of each of the semiconductors.

BRIEF DESCRIPTION OF THE FIGURES

FIG. 2A is a cross section of a device precursor after formation of a waveguide ridge in a light-transmitting medium.

FIG. 2B is a cross section of the device precursor of FIG. 2A after forming a cladding layer on the light-transmitting medium.

FIG. 2C is a cross section of the device precursor of FIG. 2B after etching trenches through the cladding layer and the light-transmitting medium.

FIG. 2D is a cross section of the device precursor after patterning a contact semiconductor on the device precursor of FIG. 2C.

FIG. 2E is a cross section of the device precursor after patterning an insulating layer on the device precursor of FIG. 2D.

FIG. 2F is a cross section of the device precursor after patterning a conducting layer on the device precursor of FIG. 2E.

DESCRIPTION

Prior attenuators include a ridge waveguide defined by a ridge of a light-transmitting medium extending upward from slabs of the light-transmitting medium. Trenches extend into the slabs of the light-transmitting medium on opposing sides of the ridge. Doped regions extend into the light-transmitting medium at the bottom of the trenches and are used to inject carriers into the waveguide during operation of the attenuator. Multiple devices that each include one or more of these attenuators are generally fabricated on a single wafer. The inventors have found the thickness of the light-transmitting medium at the bottom of the trenches can be highly inconsistent between different wafers and also across the devices on a single wafer. The trenches are generally etched into the light-transmitting medium. As a result, the inconsistency is believed to be a result of the variation in original thickness of the light-transmitting medium between different wafers and the variations in etch uniformity across a single wafer. Because the thickness of the light-transmitting medium at the bottom of the trench is often on the order of 0.5 to 1 microns, the variations in this thickness are a large source of waste in the fabrication process.

The inventors have found that the light-transmitting medium at the bottom of the trench can be removed and replaced with other materials such as contact semiconductors. As an example, a light-transmitting medium such as silicon at the bottom of the trench can be removed and polysilicon can be deposited in the trench. The contact semiconductors can be formed in the bottom of the trenches with deposition techniques. Deposition techniques are generally more uniform across a wafer than can be achieved with etching. Additionally, since the light-transmitting medium is removed from the bottom of the trench before the new material is deposited in the bottom of the trench, the non-uniformity of the light-transmitting medium between different wafers does not affect the thickness of the contact semiconductors at the bottom of the trench. Accordingly, the placement of the contact semiconductors in the bottom the trench increases the fabrication yield. While the use of an additional material in the bottom of the trench can increase the number of steps and complexity of fabricating the device, the increase in product yield more can make up for the these deficiencies.

Figure 1A:
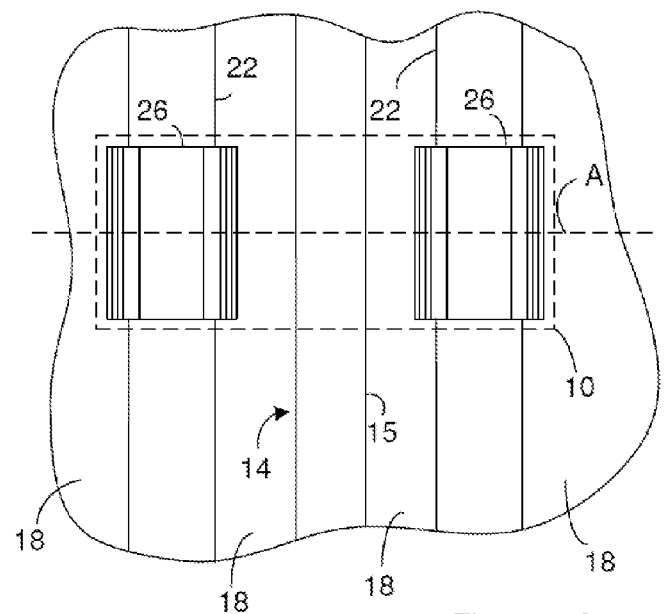
FIG. 1A is a topview of an optical device having an optical attenuator. The optical device includes trenches positioned on opposing sides of a ridge waveguide.
Figure 1B:
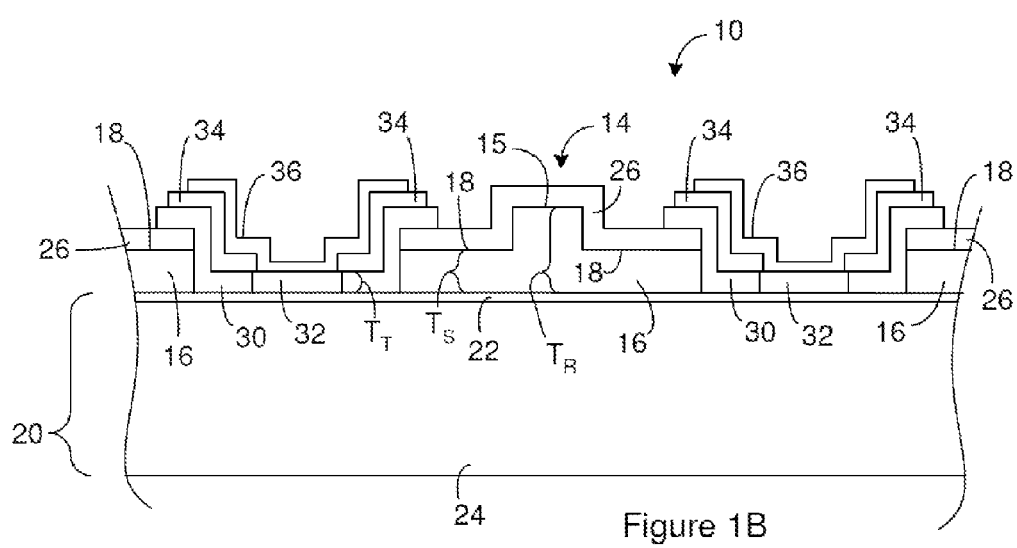
FIG. 1B is a cross section of the optical device shown in FIG. 1A taken along the line labeled A.

FIG. 1A is a topview of an optical device within the class of devices known as planar optical device. FIG. 1B is a cross section of the optical device shown in FIG. 1A taken along the line labeled A in FIG. 1A. The optical device includes an optical attenuator 10 positioned so as to attenuate light signals traveling along a ridge waveguide 14. The waveguide 14 is defined by a ridge 15 of light-transmitting medium 16 extending from slab regions 18 of the light-transmitting medium 16. The light-transmitting medium 16 is positioned on a base 20. In some instances, the base 20 includes an insulator 22 on a substrate 24.

FIG. 1A and FIG. 1B illustrate the optical device built on a silicon-on-insulator wafer. A silicon-on-insulator wafer includes a layer of silica between an upper layer of silicon and the lower layer of silicon. The upper layer of silicon serves as the light-transmitting medium 16. The silica serves as the insulator 22 and the second layer of silicon serves as the substrate 24. The portion of the base 20 adjacent to the light-transmitting medium 16 constrains the light signals within the waveguide 14. For instance, the insulator 22 can have an index of refraction that is less than the index of refraction of the light-transmitting medium 16. The reduced index of refraction of the light-transmitting medium 16 can provide reflection that constrains light signals within the waveguide 14. Although FIG. 1A and FIG. 1B illustrate the optical device built on a silicon-on-insulator wafer, the optical device can be built on other platforms. Other suitable light-transmitting media 16 include, but are not limited to, silicon, polymers, silica, SIN, GaAs, InP and LiNbO$_3$.

The ridge 15 has a thickness labeled $T_R$ and the slab region has a thickness labeled $T_S$. A suitable ridge thickness, $T_R$, includes, but is not limited to a thickness greater than 2 µm, 1 µm, or 0.1 µm and/or less than 4 µm, 6 µm, 8 µm, or 14 µm. A suitable slab region thickness, $T_S$, includes, but is not limited to a thickness greater than 0.1 µm, 0.5 µm and or 1 µm and/or less than 2 µm, 4 µm, 6 µm or 13 µm. In one example, $T_R$ is about 3 µm, and $T_S$ is about 1.8 µm.

A cladding 26 is position over the light-transmitting medium 16 such that the light-transmitting medium 16 is between the cladding 26 and the base 20. For instance, the ridge 15 of the waveguide and the slab regions 18 of the light-transmitting medium 16 are between the cladding 26 and the base 20. Accordingly, the cladding 26 can be a waveguide cladding. Suitable claddings 26 include, but are not limited to, silica, SiN, and polymers.

Trenches 28 extend into the slab regions 18 on opposing sides of the waveguide 14. The light-transmitting medium 16 is removed from the bottom of the trenches 28. As a result, the trenches 28 extend down to the base 20. For instance, the trench 28 can be constructed such that a lateral side of the slab regions 18 extends down to the base 20. For instance, the trenches 28 can extend down to the insulator 22 and/or the lateral sides of the slab regions 18 can extend down to the insulator 22.

A contact semiconductor 30 is positioned in the bottom of each trench 28. The contact semiconductor 30 is a different material from the light-transmitting medium 16. For instance, the contact semiconductor 30 can be a different form of the light-transmitting medium 16 or can have a different composition from the light-transmitting medium 16. For instance, the contact semiconductor 30 can be polysilicon while the light-transmitting medium 16 is monocrystalline silicon. In some instances, the contact semiconductor 30 and the light-transmitting medium 16 are the same material. The contact semiconductor 30 can be in physical contact with the base 20. For instance, the contact semiconductor 30 can be in physical contact with the insulator 22. Each contact semiconductor 30 extends over a lateral side of one or more slab regions 18. Since the cladding 26 is not positioned in the trenches 28, the contact semiconductor 30 can be in direct physical contact with the lateral side of one or more slab regions. As a result, the cladding 26 does not limit carrier transfer between from the contact semiconductor 30 and the light-transmitting medium 16 during operation of the attenuator. The contact semiconductor 30 extends over one or more of the slab regions 18 such that the slab region is between the contact semiconductor 30 and the base.

The thickness of the contact semiconductor 30 in the bottom of the trench 28 is labeled $T_T$. Reducing the thickness of the contact semiconductor 30, $T_T$, can increase the efficiency of the attenuation. A suitable thickness for the contact semiconductor 30, $T_T$, includes, but is not limited to a thickness less than 1 µm, less than 0.5 um µm, or less than 0.2 µm and/or greater than 0.4 um, greater than 0.8 um, or greater 1.2 um. In some instances, reducing the trench thickness can increase the attenuation efficiency.

A doped region 32 is formed in all or a portion of the contact semiconductor 30. One of the doped regions 32 includes a P-type material and one of the doped regions 32 includes an N-type material. The doped regions 32 can extend part way into the contact semiconductor 30 or can extend all the way through the contact semiconductor 30 into contact with the base 20 and/or insulator 22. Extending the doped regions 32 further toward the base 20 can increase the efficiency of the attenuator by constraining additional carriers between the doped regions 32.

An electrical insulator 34 is positioned over the contact semiconductor 30 and can contact the contact semiconductor 30. The electrical insulator 34 is not positioned over a portion of the contact semiconductor 30. In particular, the electrical insulator 34 is not over a portion of each of the doped regions 32. As will become evident below, the portion of the doped regions 32 that is not covered by the electrical insulator 34 serves as the electrical contacts for the doped regions 32. Suitable electrical insulators 34 include, but are not limited to, silica, SiN, and polymers.

An electrical conductor 36 is in electrical communication with the doped regions 32 of the contact semiconductor 30. One or more portions of each electrical conductor 36 can be positioned over the electrical insulator 34. For instance, one of the electrical insulators 34 can be positioned between one or more portions of each electrical conductor 36 and the contact semiconductor 30. Suitable electrical conductors 36 include, but are not limited to, doped polymers, and metals such as Al, Ti, and TiN.

During operation of the attenuator, a forward bias can be applied to the electrical conductors 36 so as to generate an electrical current through the waveguide. The resulting injection of carriers into the waveguide causes free carrier absorption that provides optical attenuation in the waveguide. Since the contact semiconductor 30 are in direct physical contact with the lateral side of one or more slab regions, carrier injection can occur through the lateral sides of the slab regions.

When the doped regions 32 do not extend across the entire bottom of the contact semiconductor 30 as shown in FIG. 1B, the carriers travel from the doped regions 32 across an undoped region of the contact semiconductor 30. The attenuator can be configured such that these undoped regions of the contact semiconductor 30 are sufficiently narrow that the carriers are transported through these regions. In some instances, the light-transmitting medium and/or doped regions 32 are doped so as to provide a PIN junction in the attenuator.

Figure 2A:
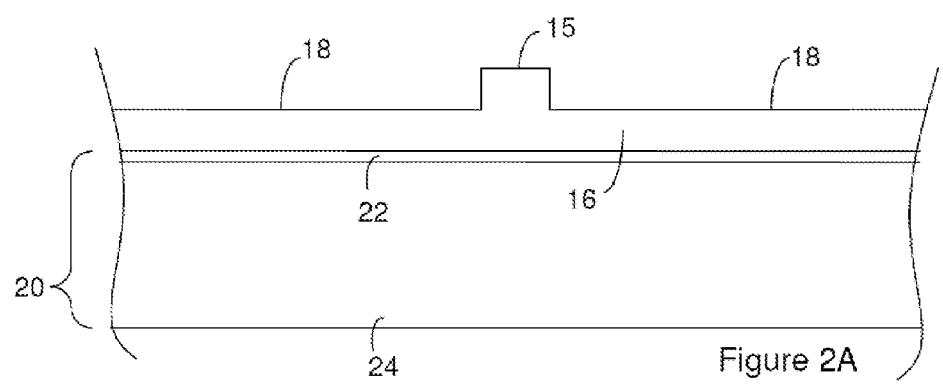
FIG. 2A through FIG. 2F illustrate a method of forming an optical device having an attenuator according to FIG. 1A and FIG. 1B.
Figure 2B:
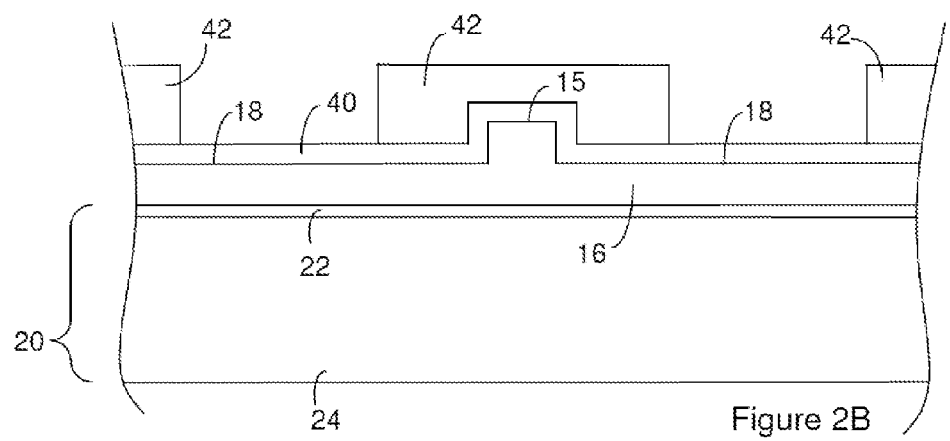
Figure 2C:
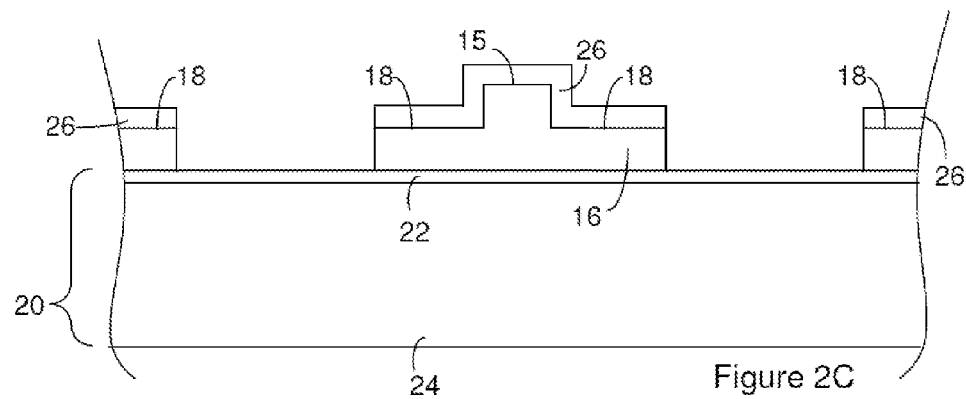
Figure 2D:
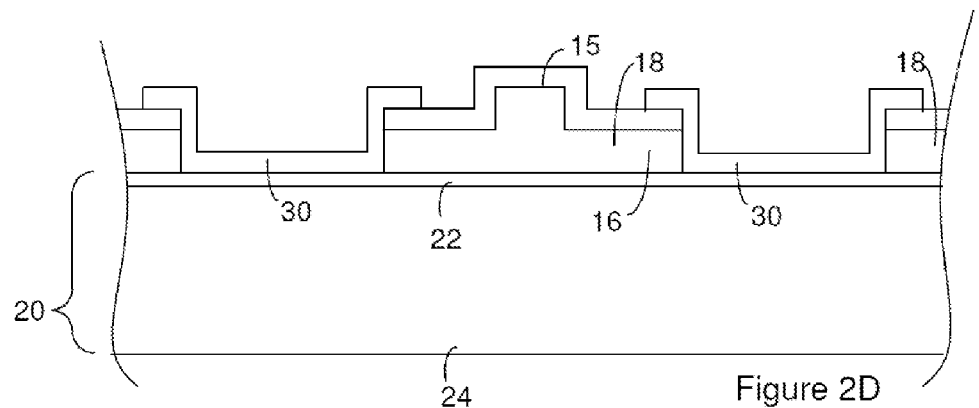
Figure 2E:
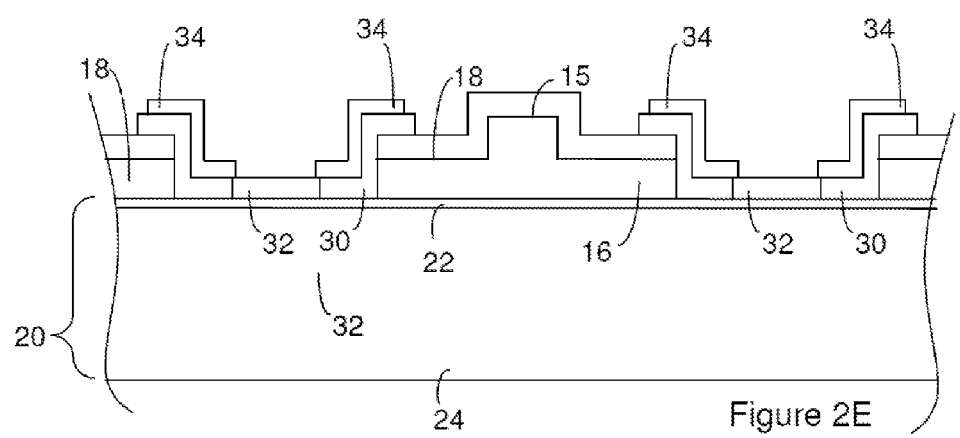
Figure 2F:
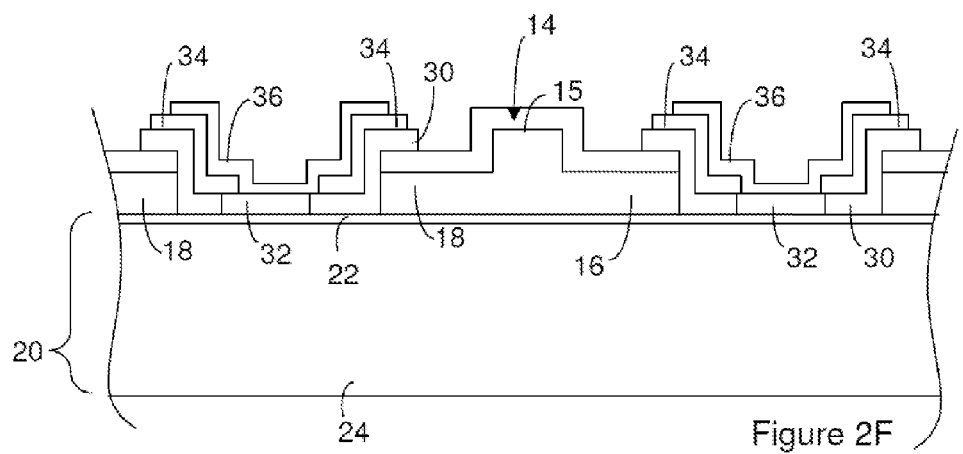

FIG. 2A though FIG. 2F illustrate a method of fabricating an optical device having an attenuator. The method can be performed on a wafer having a light-transmitting medium 16 positioned on a base 20. As noted above, an example of a suitable wafer includes, but is not limited to, a silicon-on-insulator wafer. The wafer is masked, a first etch performed and the first mask removed so as to provide the device precursor illustrated in FIG. 2A. The first mask is formed so as to protect the region of the device precursor where the ridge of the ridge waveguides 14 is to be formed on the device precursor.

A cladding layer 40 is formed on the device precursor of FIG. 2A. As will become evident below, the cladding layer becomes the cladding 26. As a result, the cladding layer 40 can be the same material as the cladding 26. A second mask 42 is formed over the cladding layer so as to provide the device precursor of FIG. 2B. The second mask 42 is formed such that the regions where the trenches 28 are to be formed remain exposed and the surrounding regions are protected. Accordingly, the second mask 42 defines the shape of the trenches 28 on the device precursor. A suitable second mask 42 includes, but is not limited to, a photoresist or an oxide.

A second etch is performed on the device precursor of FIG. 2B and the second mask removed so as to provide the device precursor of FIG. 2C. The second etch is performed so as etch through the light-transmitting medium 16 to the base. The second etch can be selected such that the base 20 and/or the insulator 22 act as an etch stop once the second etch has etched through the light-transmitting medium 16. During the second etch, the etchant can optionally be changed upon or after etching through the cladding 40. For instance, upon or after etching through the cladding 40, the etchant can be switched from a first etchant that is selective for the cladding 40 to a second etchant that is selective for the light-transmitting medium 16. When it is desired for the base 20 and/or the insulator 22 act as an etch stop, the second etchant can be selective for the light-transmitting medium 16. For instance, the second etchant can etch the light-transmitting medium 16 at a faster rate than the base 20 and/or the insulator 22. If the etchant was not switched, the insulator 22 and cladding 40 were the same material, and the insulator 22 acted as an etch stop, the cladding 40 would also work as an etch stop and the second etch would be highly inefficient. As a result, twitching from the first etchant to the second etchant allows the insulator 22 and cladding 40 to be the same material such as silica.

A contact layer is formed on the device precursor of FIG. 2C. The contact layer is patterned so as to form the contact semiconductor 30 on the device precursor of FIG. 2D. Since the contact layer becomes the contact semiconductor 30, the contact layer can include or consist of the same material as the contact semiconductor 30. Suitable methods of forming the contact layer on the device precursor include, but are not limited to, deposition, evaporation, and sputtering. Deposition of the deposited material may be preferred to growth of the deposited material because deposition is cheaper, controllable and need not conform the crystalline structure of the underlying materials. Deposition techniques can be distinguished from growth techniques because their structure does not conform to the crystalline structure of the underlying material. Accordingly, when a deposited material has a crystalline structure, the crystalline structure of the deposited material can be different from the crystalline structure of the material upon which it is deposited even at the interface of the materials. Suitable methods for patterning the contact layer include, but are not limited to, photolithography, electron lithography, and X ray-lithography.

The contact semiconductor 30 is doped so as to provide the doped regions 32 in the contact semiconductor 30 on the device precursor of FIG. 2E. Forming the doped regions 32 can include forming an additional mask (not shown). The additional mask is formed so as to protect the region(s) of the contact semiconductor 30 where the P type doped region is to be formed and the remaining exposed regions of the contact semiconductor 30 are doped with an N type impurity. The additional mask is removed and a second additional mask (not shown) formed so as to protect the region(s) of the device precursor where the N type doped region was formed and the exposed regions of the contact semiconductor 30 are doped with a P type impurity. The second additional mask is then removed. A suitable first additional mask and a suitable second additional mask includes, but is not limited to, a photoresist or an oxide.

Although the region of N type material is described as being formed before the region of P type material, the order of impurity formation can be reversed. Further, other methods of forming the regions of N type material and P type material can be employed. For instance, the P type and N type material can be formed by impurity diffusion. Additionally, the regions of N type material can be formed by attaching a piece of N type material to the device precursor at the location the region of N type material is desired. The regions of the P type material can be similarly formed. In some instances, the regions of N type material and/or P type material are formed to a concentration of $10^{\wedge}(17\text{-}21)/cm^3$ at a thickness of less than 13 µm, 2 µm, or 0.1 µm.

An insulating layer is formed on the device precursor of FIG. 2D. The insulating layer is patterned so as to form the electrical insulator 34 on the device precursor of FIG. 2E. Since the insulating layer becomes the electrical insulator 34, the insulating layer can include or consist of the same material as the electrical insulator 34. Suitable methods of forming the insulating layer on the device precursor include, but are not limited to, deposition, evaporation, and sputtering. Suitable methods for patterning the insulating layer include, but are not limited to, photolithography, electron lithography, and x-ray lithography.

A conducting layer is formed on the device precursor of FIG. 2E. The conducting layer is patterned so as to form the electrical conductors 36 on the device precursor of FIG. 2F. Since the conducting layer becomes the electrical conductors 36, the conducting layer can include or consist of the same material as the electrical conductors 36. Suitable methods of forming the conducting layer on the device precursor include, but are not limited to, deposition, evaporation, and sputtering. Suitable methods for patterning the conducting layer include, but are not limited to, photolithography, electron lithography, and x-ray lithography.

The method of FIG. 2A through FIG. 2F can be performed in a sequence other than the illustrated sequence. For instance, the cladding 26 can be formed on the light-transmitting medium after the trenches 28 are formed.

In theory, it may be possible to operate the optical attenuators described above as a modulator. However, optical modulators generally require speeds that cannot be achieved using the above structures. In order to achieve these speeds, optical modulators typically use other modulation mechanisms such as the Franz-Keldsyh effect. Additionally or alternately, the modulation typically occurs in a material other than the waveguide medium. For instance, many modulators guide light signals through a light-transmitting medium when the light is not being modulated but then switch to guiding light signals through a different medium when the light is being modulated. Electro-absorption media such as silicon is an example of a medium in which light signals are often modulated. Since the attenuators and waveguides disclosed about guide light signals through the same materials, these attenuators are associated with simplified fabrication techniques.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an attenuator on an optical device, comprising:
   forming a waveguide ridge in a light-transmitting medium, the ridge extending upwards from slab regions of the light-transmitting medium, the light-transmitting medium being positioned on a base;
   forming trenches in the slab regions of the light-transmitting medium, the trenches extending through the light-transmitting medium to the base, the ridge being between the trenches;
   forming a semiconductor in a bottom of each of the trenches; and
   doping a region of each of the semiconductors.

2. The method of claim 1, wherein the semiconductor in the bottom of each trench contacts the base.

3. The method of claim 1, wherein forming the semiconductor includes depositing the semiconductor.

4. The method of claim 1, wherein the semiconductor is a different material from the light-transmitting medium.

5. The method of claim 4, wherein the semiconductor is polycrystalline while the light-transmitting medium is monocrystalline.

6. The method of claim 5, wherein the polycrystalline semiconductor is polysilicon and the monocrystalline light-transmitting medium is monocrystalline silicon.

7. The method of claim 1, wherein the semiconductor is in direct physical contact with a lateral side of the slab region of the light-transmitting medium.

8. The method of claim 1, wherein a cladding is between the semiconductor and a top of at least one of the slab regions of the light-transmitting medium.

9. The method of claim 8, wherein the cladding is positioned over the ridge and is in direct physical contact with the light-transmitting medium.

10. The method of claim 8, wherein the semiconductor is in direct physical contact with a lateral side of the slab region of the light-transmitting medium.

11. The method of claim 1, wherein doping a region of each of the semiconductors includes forming a doped region that extends through at least one of the semiconductors to the base.

12. The method of claim 1, wherein doping a region of each of the semiconductors includes forming doped region in the semiconductors and further comprising:
    applying electrical energy to the doped regions so as to inject carriers into the waveguide such that a light signal traveling through the waveguide is attenuated.

13. The method of claim 1, wherein the semiconductors are doped so as to form a PIN junction.

14. The method of claim 1, wherein a lateral side of each slab region is spaced apart from the ridge.

15. An optical attenuator, comprising:
    a waveguide that include a ridge of a light-transmitting medium extending upwards from slab regions of the light-transmitting medium, the light-transmitting medium being positioned on a base;
    trenches extending through the slab regions to the base, the ridge being between the trenches;
    a contact semiconductor in a bottom of each of the trenches, the contact semiconductor including a doped region,
       the contact semiconductor being polycrystalline and the light-transmitting medium being monocrystalline.

16. The attenuator of claim 15, wherein the contact semiconductors are each in direct physical contact with a lateral side of one of the slab regions of the light-transmitting medium.

17. The attenuator of claim 15, wherein the contact semiconductor is polysilicon and the light-transmitting medium is monocrystalline silicon.

* * * * *